(12) United States Patent
Shimizu

(10) Patent No.: US 6,515,271 B1
(45) Date of Patent: Feb. 4, 2003

(54) CMOS IMAGE SENSOR UNIT WITH SERIAL TRANSMITTING FUNCTION

(75) Inventor: Kazuo Shimizu, Tokyo (JP)

(73) Assignee: Olympus Optical Co., Ltd. (JP)

( * ) Notice: Subject to any disclaimer, the term of this patent is extended or adjusted under 35 U.S.C. 154(b) by 0 days.

(21) Appl. No.: 09/574,380

(22) Filed: May 19, 2000

(30) Foreign Application Priority Data

May 21, 1999 (JP) .......................................... 11-141067

(51) Int. Cl.$^7$ .............................................. H01L 27/00

(52) U.S. Cl. ................................... 250/208.1; 257/292

(58) Field of Search ........................... 250/208.1, 214.1, 250/214 P; 348/294, 308, 298, 300, 301; 257/292, 443, 444

(56) References Cited

U.S. PATENT DOCUMENTS 6,166,367 A * 12/2000 Cho ........................ 250/208.1

* cited by examiner

Primary Examiner—Robert H. Kim
Assistant Examiner—Hoon K. Song
(74) Attorney, Agent, or Firm—Straub & Pokotylo; John C. Pokotylo

(57) ABSTRACT

A CMOS image sensor unit with serial data transmitting function is disclosed. A CMOS sensor unit as a two-dimensional sensor constituted by a plurality of CMOS elements arranged in a regular array in the row and column directions, a clock unit for obtaining a clock signal at a predetermined oscillation frequency, a PLL circuit unit receiving the clock signal from the clock unit and a parallel-to-serial converter unit for converting parallel data read out from the CMOS sensor to serial data in synchronism to the clock signal from the PLL circuit are mounted on a single image sensor unit.

33 Claims, 12 Drawing Sheets

CMOS IMAGE SENSOR UNIT WITH SERIAL TRANSMITTING FUNCTION

BACKGROUND OF THE INVENTION

The present invention relates to CMOS image sensor units with serial data transmitting function and, more particularly, to CMOS image sensor units with serial data transmitting function, which are simple in construction while being reduced in size and cost, and pick-up units and image data transmitting and receiving systems using the same.

With recent manufacture yield improvement and cost reduction of image pick-up elements, various image pick-up devices utilizing semiconductor image pick-up elements, such as those in which an image pick-up element is set in a predetermined position in various apparatuses or buildings to pick up an image, convert the picked-up image into an electric signal and display the signal thus obtained in a display, have become actually used.

As the image pick-up element adopted for the above purpose, CCD has heretofore been usually used, which can be manufactured with high yield and at relatively low cost and have relatively stable characteristics with low fluctuation between individual elements. However, CCD requires three kinds of driving circuits, causing a relatively large power consumption. For this reason, image pick-up devices using CMOS element as the image pick-up element have recently been attracting attention.

Compared to CCD, however, the characteristics of CMOS have heretofore been fluctuated greatly with individual elements, resulting in appearance of fixed pattern noise in image data obtained by using a number of CMOS elements. For this reason, the CMOS has element not yet been widely used as the image pick-up element. In the mean time, with recent improvement in the CMOS manufacturing techniques, characteristics fluctuations with individual elements have become reduced, and the generation of fixed pattern noise in image data has become suppressed. Thus, the low power consumption merit of CMOS over CCD has started attracting attention.

An image signal which is obtained as electric signal by conversion in such an image pick-up element is transmitted to personal computer or like image processing unit. The image signal obtained as electric signal by conversion in the image pick-up element, is often converted to a digital signal and transmitted as parallel signal via a plurality of cables. The prior art sensor unit as described, however, has the following problems.

(1) System Interface

A digital signal obtained by a two-dimensional sensor, is usually required to be transmitted by multiple-bit high-rate transmission. For example, with a so-called CIF size image constituted by 320×240 pixels, in a case of assigning 8 bits per pixel, signals of total of 11 bits of pixel clocked at 6.75 MHz, vertical and horizontal synchronizing signals and 8 bits of pixel data. Moreover, in color image transmission 8 bits are often considered necessary for each of the R, G and B colors. This means that it is necessary to transmit 27 signals. If it is intended to transmit these signals at a high rate, it gives rise to problems in each data signal skew for the clock. In other words, it is difficult to normalize the impedance, the load capacitance, etc. of all the 27 signal line cables, inevitably resulting in fluctuations, phase deviations of data signal with respect to the clock signal, defective digital signal transmission and consequent image quality deterioration. Therefore, a plurality of signals are necessary as the above two-dimensional image signal. The prior art sensor unit is thus not suited for systems aiming at reducing size and power consumption.

(2) Current Consumption

In a two-dimensional sensor with the digital output as described above, a sudden change in its output may result in noise generation. In view of the interface with external circuitry, usually an output capacity of at least about 2 mA is set for output buffer current. Simultaneous changes in 24 bit data cause a current change of 48 mA caused to momentarily flow into the output buffer. This current exceeds the consumed current in the two-dimensional sensor itself. Therefore, systems aiming at reducing size and power consumption pose problems in consumed current into the output buffer.

(3) Noise Generation

A great current caused to flow to the output buffer affects the sensor unit of the chip. In the chip, the sensor unit, inclusive of photo-diodes and amplifiers, operate analogwise, and current changes other than the signal are preferably as less as possible. Such great current changes as in the output buffer greatly affect the sensor unit. Since such changes are synchronized to the clock, they are also synchronized to the sensor operation and affect as image noise.

(4) Distance of Data Transmission

In an output buffer which is usually employed, the load capacity is about 50 pF, and the current capacity is about 4 mA. If it is intended to use such an output buffer for data transmission at a high rate, it is inevitable to set a high matching impedance, resulting in shortening the transmission distance. For example, assuming the current capacity to be 4 mA, the least matching resistance is 1.25 kΩ at power supply voltage of 5 V. Where the video signal is transmitted as analog signal, usually the matching is done with 50Ω, and in SCSI interface (for high-rate digital transmission) it is executed with 330/220Ω. Thus, even in the matching impedance alone, for instance, the difference is about 10 times, and with transmission distance increase the signal attenuation is increased by 10 times. This is equivalent to a signal change increase to 10 times. That is, sufficient transmission can not be obtained unless the transmission distance or like influencing factor is reduced to one-tenth. Since common GND to all these digital data is adopted, a change in GND has adverse effects on all the digital signals. This is a significant cause of error occurrence in multiple-bit digital transmission, and adversely affects the image quality as noise (i.e., signal irrelevant to the sense signal) in the sensor unit.

It is summarized that the problems in the above prior art sensor unit are as follows. Since the sensor unit output is parallel data, signal lines (or cables) are required in number corresponding to the number of the parallel channels, thus leading to complication of the construction and size and cost increase thereof.

Besides, the increase of the number of cables gives rise to total current increase and hence consumed current increase.

Furthermore, the plurality of cables slightly vary in length, and characteristics fluctuations result in signal skew generation, giving rise to image quality deterioration problems.

SUMMARY OF THE INVENTION

An object of the present invention is to solve the above problems in the prior art by the provision of a CMOS sensor unit with serial data transmission function, which reduces consumed power, has simplified construction, is small in size, is subject to less effects of noise and less image quality deterioration and permits long distance data transmission, as well as an image pick-up unit and an image data transmitting and receiving system using the same.

According to a first aspect of the present invention, there is provided a CMOS image sensor unit with serial data transmitting function comprising: a CMOS sensor unit as a two-dimensional sensor constituted by a plurality of CMOS elements arranged in a regular array in the row and column directions; a clock unit for obtaining a clock signal at a predetermined oscillation frequency; a PLL circuit unit receiving the clock signal from the clock unit; and a parallel-to-serial converter unit for converting parallel data read out from the CMOS sensor unit to serial data in synchronism to the clock signal from the PLL circuit; these units being mounted on a single image sensor unit.

According to a second aspect of the present invention, there is provided a CMOS image sensor unit with serial data transmitting function comprising: a CMOS sensor unit as a two-dimensional sensor constituted by a plurality of CMOS elements arranged in a regular array in the row and column directions; a clock unit for obtaining a clock signal at a predetermined oscillation frequency; a PLL circuit unit receiving the clock signal from the clock unit; a parallel-to-serial converter unit for converting parallel data read out from the CMOS sensor to serial data in synchronism to the clock signal from the PLL circuit; and a drive circuit unit for converting the serial image data obtained by conversion in the parallel-to-serial converter unit to a signal complying with an LVDS (low voltage differential signalling) signal transmitting system and providing the signal thus obtained as LVDS data; these units being mounted on a single image sensor unit.

According to a third aspect of the present invention, there is provided a CMOS image sensor unit with serial data transmitting function comprising: a CMOS sensor unit as a two-dimensional sensor constituted by a plurality of CMOS elements arranged in a regular array in the row and column directions; a clock unit for obtaining a clock signal at a predetermined oscillation frequency; a PLL circuit unit receiving the clock signal from the clock unit; a memory for storing image data provided from the CMOS sensor unit; and a parallel-to-serial converter unit for converting parallel data read out from the CMOS sensor unit to serial data in synchronism to the clock signal from the PLL circuit; these units being mounted on a single image sensor unit.

According to a fourth aspect of the present invention, there is provided a CMOS image sensor unit with serial data transmitting function comprising: a CMOS sensor unit as a two-dimensional sensor constituted by a plurality of CMOS elements arranged in a regular array in the row and column directions; a clock unit for obtaining a clock signal at a predetermined oscillation frequency; a PLL circuit unit receiving the clock signal from the clock unit; a memory for storing image data provided from the CMOS sensor unit; a parallel-to-serial converter unit for converting parallel data read out from the CMOS sensor unit to serial data in synchronism to the clock signal from the PLL circuit; and a drive circuit unit for converting the serial image data obtained by conversion in the parallel-to-serial converter unit to a signal complying with an LVDS (low voltage differential signalling) signal transmitting system and providing the signal thus obtained as LVDS data; these units being mounted on a single image sensor unit.

The memory is a line memory or a frame memory.

According to a fifth aspect of the present invention, there is provided a CMOS image sensor unit with serial data transmitting function comprising: a CMOS sensor unit as a two-dimensional sensor constituted by a plurality of CMOS elements arranged in a regular array in the row and column directions; a clock unit for obtaining a clock signal at a predetermined oscillation frequency; a PLL circuit unit receiving the clock signal from the clock unit; a parallel-to-serial converter unit for converting parallel data read out from the CMOS sensor unit to serial data in synchronism to the clock signal from the PLL circuit; and a memory for storing the serial data from the parallel-to-serial converter unit; these units being mounted on a single image sensor unit.

The clock unit includes an oscillator for generating the clock signal by oscillation.

The clock unit includes a means for introducing a clock signal generated from an external oscillator.

The PLL circuit unit includes a program type PLL circuit.

The CMOS image sensor unit with serial data transmitting function further comprises a pick-up lens.

In the CMOS image sensor unit with serial data transmitting function, a drive circuit unit for converting the serial image data read out from the memory to a signal complying with an LVDS (Low Voltage Differential Signalling) signal transmitting system and providing the signal thus obtained as LVDS data is also mounted on the single image sensor unit.

The image data is sent out from the parallel-to-serial converter unit, the drive circuit unit or the memory according to an external transfer enable signal.

Predetermined image data is stored in the memory and read out with image data obtained by pick-up.

Predetermined image data is stored in the memory and read out in such a form that it is combined with image data obtained by pick-up.

Preset data is stored in the memory and read out together with the image data obtained by pick-up.

The preset data is stored in the memory and read out together with the image data obtained by pick-up and the preset data includes at least either sensor No. data specifying a sensor unit or master/slave data specifying the master/slave relation of a sensor unit.

According to a sixth aspect of the present invention, there is provided an image pick-up unit comprising a card-like body, the above CMOS image sensor unit being mounted on one surface of the card-like body, the card-like body having a card insertion hole formed in one surface of it, the card insertion hole permitting a card-like memory, which can store image data provided from the CMOS image sensor unit, to be inserted and taken out through it into and out of the body.

According to a seventh aspect of the present invention, there is provided an image data transmitting and receiving system, in which the above CMOS image sensor unit or the above image pick-up unit is provided on transmitting side, and which comprises only a single data receiving unit for receiving data sent out from the transmitting side.

According to an eighth aspect of the present invention, there is provided an image data transmitting and receiving system, in which a plurality of the above CMOS image sensor units or a plurality of the above image pick-up units are provided on transmitting side units, and which comprises only a single data receiving unit provided on receiving side for receiving data sent out from the transmitting side.

According to a ninth aspect of the present invention, there is provided an image data transmitting and receiving system, in which only a single CMOS image sensor unit stated above or only a single image pick-up unit stated above is provided on transmitting side, and which comprises a plurality of data receiving units provided on receiving side for receiving data sent out from the transmitting side, the transmitting side CMOS image sensor unit being accessed independently by the receiving side data receiving units for receiving image data.

According to a tenth aspect of the present invention, there is provided an image data transmitting and receiving system, which comprises a plurality of CMOS image sensor units or a plurality of image pick-up units stated above, one of the CMOS image sensor units being used as master data receiving unit having a right of main control, the other CMOS image sensor units being all used as slave units, the master data receiving unit generating a synchronizing signal and accessing the slave units in synchronism with the synchronizing signal for receiving image data.

According to an eleventh aspect of the present invention, there is provided an image data transmitting and receiving system, wherein a plurality of CMOS image sensor units or a plurality of image pick-up units stated above are provided on transmitting and receiving sides, the transmitting and receiving sides being connected by common bus lines, vacant ones thereof being used for transmitting and receiving data.

Other objects and features will be clarified from the following description with reference to attached drawings.

PREFERRED EMBODIMENTS OF THE INVENTION

Preferred embodiments of the present invention will now be described with reference to the drawings.

Figure 1:
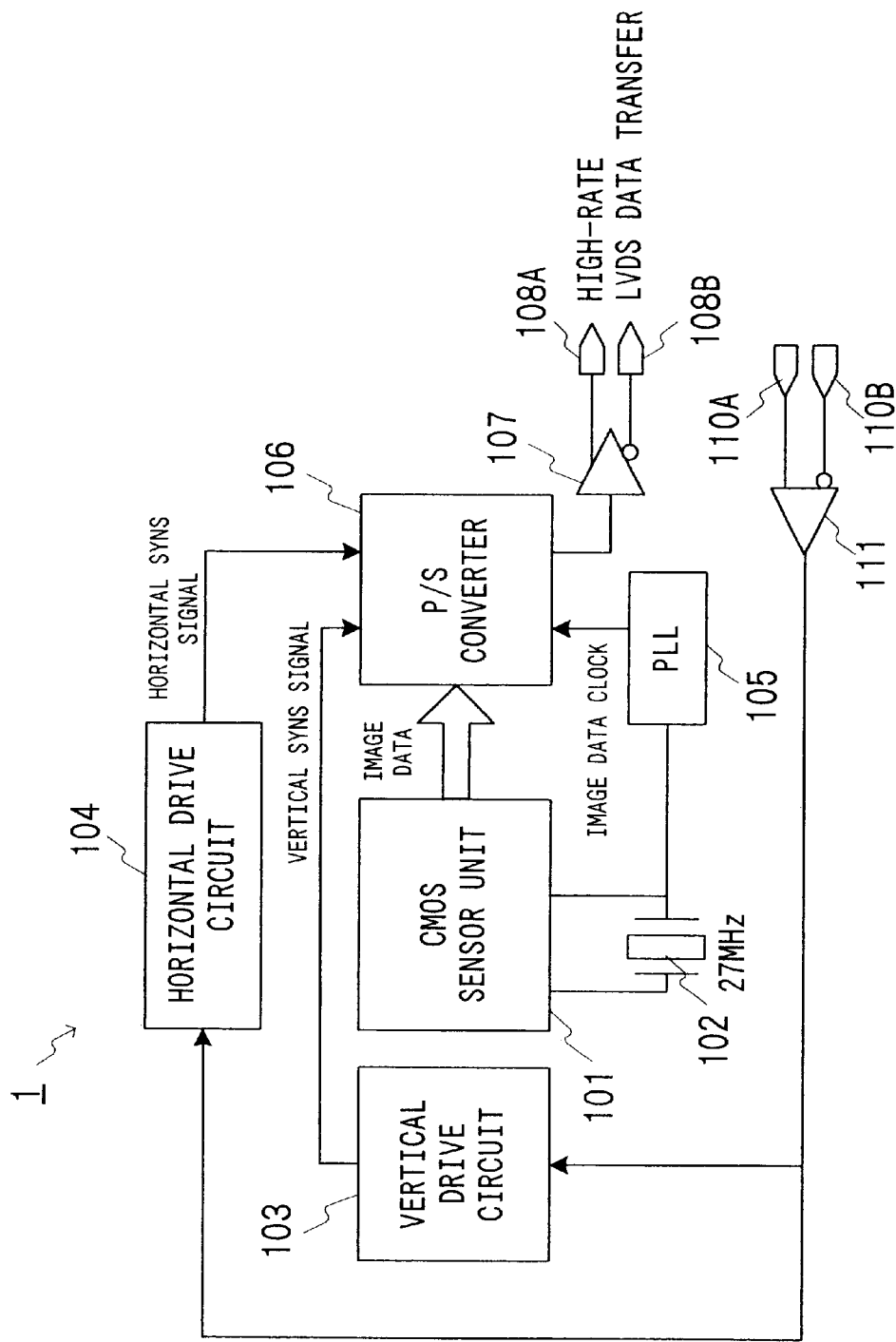
FIG. 1 is a block diagram showing a preferred embodiment of the CMOS image sensor unit (on transmitting side) with serial data transmitting function according to the present invention.

Embodiment of the CMOS image sensor unit with serial data transmitting function will now be described with reference to the drawings. FIG. 1 is a substantial block diagram showing a preferred embodiment of the CMOS sensor unit (on transmitting side) with serial data transmitting function.

This embodiment of the CMOS image sensor unit 1 with serial data transmitting function has a CMOS sensor unit 101 as two-dimensional sensor, which is constituted by a number of CMOS elements arranged in a regular array in the row and column directions. An image signal is read out from each of the CMOS elements in synchronism to a clock signal from an oscillator 102, which has an oscillation frequency of, for instance, 27 Hz. The CMOS sensor unit 101 also includes an amplifier for amplifying image signal from each CMOS element and an A/D converter for converting the amplified image signal to digital image data. The unit 101 thus provides the digital image data.

A PLL circuit 105 feeds out an image data clock, obtained by processing on the basis of an oscillation frequency signal from an oscillator 102, to a parallel-to-serial converter 106. The parallel-to-serial converter 106 receives a vertical synchronizing signal provided from a vertical drive circuit 103 for vertically driving the CMOS elements in the CMOS sensor unit 101 and a horizontal synchronizing signal provided from a horizontal drive circuit 104 for horizontally driving the CMOS elements in the CMOS sensor unit 101, and converts the parallel image data received from the CMOS sensor unit 101 to serial data under control of the image data clock from the PLL circuit 105. The image data clock from the PLL circuit 105 is converted through the parallel-to-serial conversion to the serial data. To secure the transmission rate, therefore, the clock frequency is correspondingly increased.

A driver 111 converts a transfer enable signal, which is inputted to input terminals 110A and 110B from an electronic apparatus, for instance a personal computer to a serial enable signal, and feeds out the serial enable signal to the vertical and horizontal drive circuits 103 and 104. Receiving the serial enable signal, the vertical and horizontal drive circuits 103 and 104 feed out the image data provided from the CMOS sensor unit 101 to the parallel-to-serial converter 106.

The serial image data obtained by conversion in the parallel-to-serial converter 106 is transferred as high-rate LVDS data from an LVDS driver 107.

The individual circuit components described above are mounted on a single image sensor unit, thus obtaining a CMOS sensor unit chip, from which the serial digital data is transmitted. This CMOS sensor unit thus can solve the problems in the CCD sensor unit using CCD that the multiple-bit structure increases the drive current. In addition, since all the necessary constituent elements are mounted on one image sensor unit, size reduction and cost reduction can be promoted.

In this embodiment, which has the above basic construction, the LVDS driver 107 (which is a code circuit) is mounted together with the other components on the chip. The LVDS driver 107 converts the serial image data provided from the parallel-to-serial converter 106 to a signal complying with the so-called LVDS (Low Voltage Differential Signalling) signal transmitting system. The LVDS signal thus obtained is transmitted, i.e., high-rate LVDS data transferred, from output terminals 108A and 108B to an image processing unit for executing such process as display, recording, printing, etc. by using a transmission line, which is relatively thin and can be easily handled, for instance a twin cable. The transfer of signal as the LVDS signal conforms with the serial transmission standards, i.e., TIA/EIA-644 standards).

Figure 3:
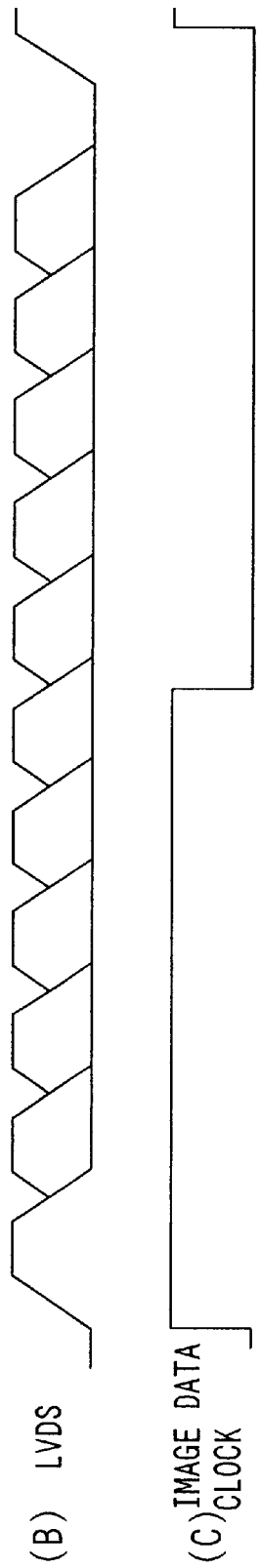
FIG. 3 shows a structure of serial image data in the embodiment of the present invention.

The serial image data provided from the output terminals 108A and 108B is formed as LVDS signal having a format configuration as shown in FIG. 3(A) in the image data clock cycle and in bit-by-bit correspondence as shown in FIG. 3(B).

In a specific example of the serial image data as shown in FIG. 3(A), subsequent to the start data the vertical and horizontal synchronizing signals, image data 7, image data 6, image data 5, image data 4, image data 3, image data 2, image data 1, image data 0 and finally stop data appear in the mentioned order. The start and stop data are prescribed by a rise and a fall instant of image data clock as shown in FIG. 3(C).

According to the present invention, it is possible to obtain the following various specific effects solving the prior art problems described above.

First, in view of the system interface, in this embodiment the PLL circuit and the parallel-to-serial converter are mounted on a chip for serial data transmission, and only a single transmission line is needed. Thus, no problem of fluctuations of the impedance, load capacity, etc., concerning each of a plurality of signal lines in the prior art arises. Also, no problem of structural complication arises. Furthermore, since only a single transmission line is needed, the power consumption is greatly reduced compared to the prior art.

Still further, according to the present invention the transmitting and receiving operations are done with differential signals on the basis of LVDS transmission. Thus, the supply current is uniformalized or averaged, and noise affecting the sensor unit is reduced. Yet further, since differential signal is dealt with, any noise, if generated, can be removed because of no inter-pair potential difference. Further, it is possible to reduce the amplitude of signal, the drive current generated magnetic field, and the EMI generation thus can be suppressed. Moreover, the distance of data transmission can be greatly expanded.

Figure 2:
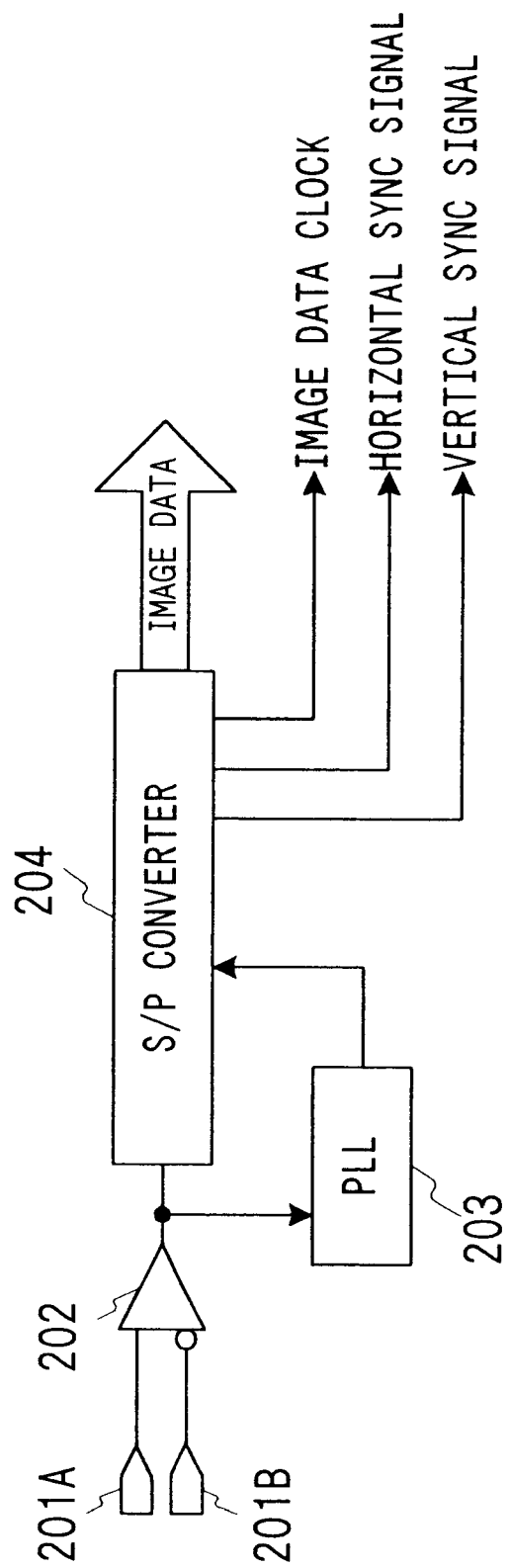
FIG. 2 is a block diagram of the receiving side image processing unit in the embodiment according to the present invention.

As shown in FIG. 2, LVDS signal transmitted from the output terminals 108A and 108B of the CMOS image sensor unit 1 with serial data transmitting function via the transmission line is inputted to input terminals 201A and 201B of a personal computer or like receiving side image processing unit, and converted in an LVDS signal receiver circuit 202 to serial digital image data to be sent out to a PLL circuit 203 and a serial-to-parallel (S/P) converter 204. The serial-to-parallel converter 204 executes a process which is converse to the process executed in the transmitting side serial-to-parallel converter 106, which converts the serial data to the parallel data and sends out the image data and horizontal and vertical synchronizing signals as the output data.

Figure 4:
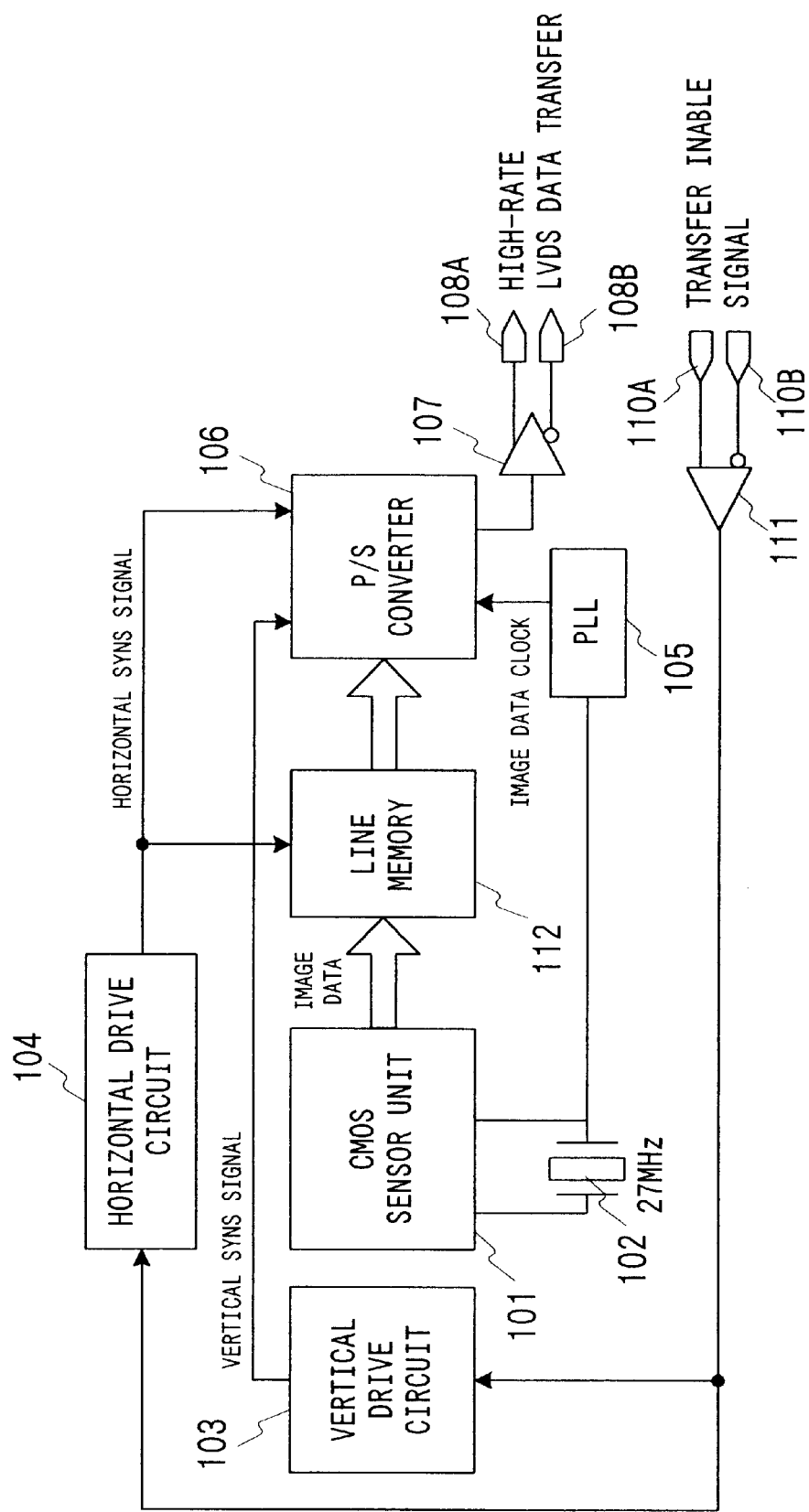
FIG. 4 is a schematic view showing a different embodiment of the CMOS image sensor unit with serial data transmitting function according to the present invention.
Figure 5:
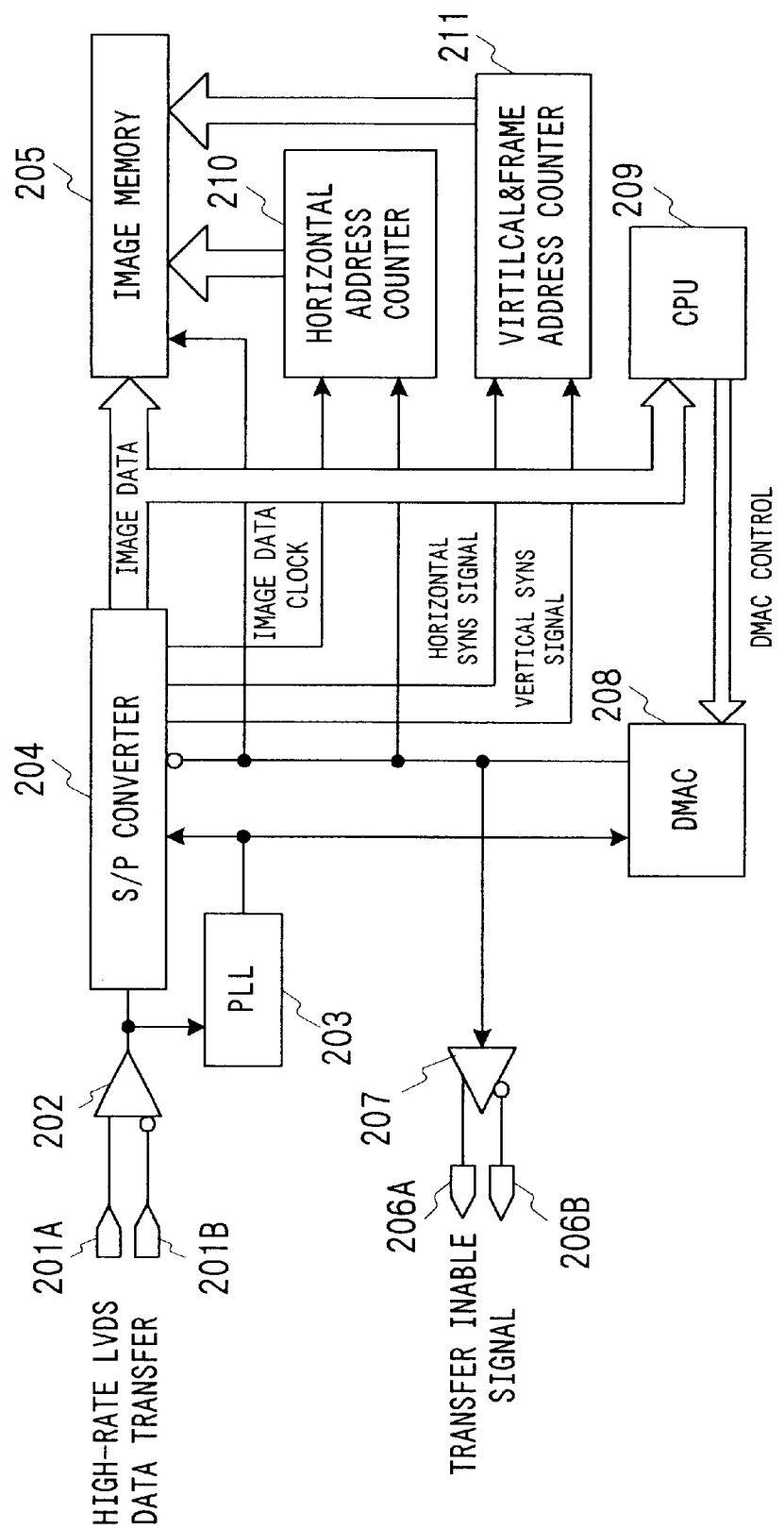
FIG. 5 is a schematic view showing the image processing unit in the receiving side in the embodiment of the present invention.
Figure 6:
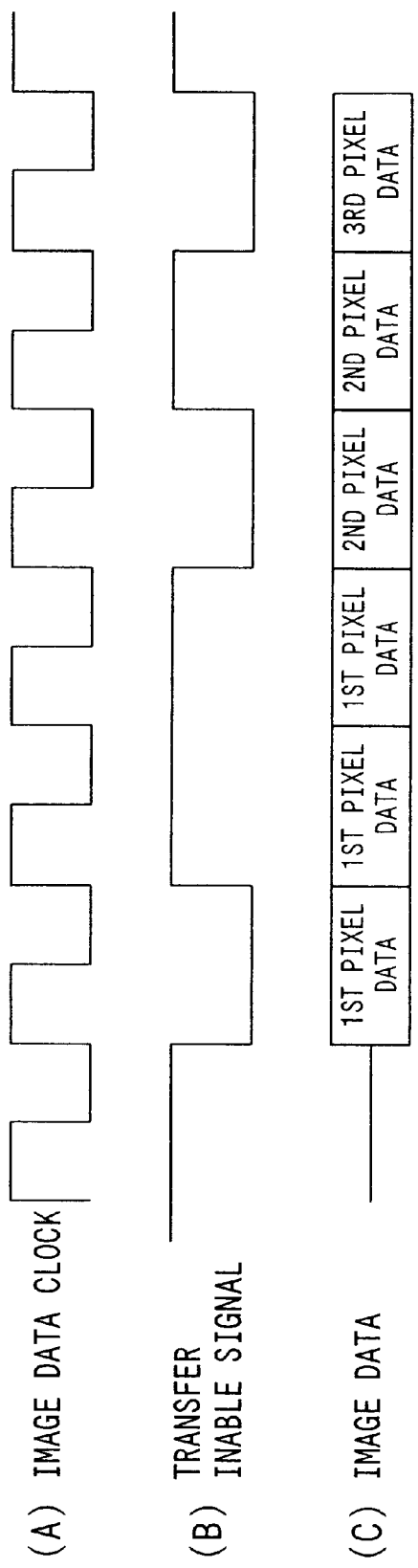
FIGS. 6(A)–(C) are timing charts showing image data clock, transfer enable signal and image data prescribing the operation of the circuits shown in FIGS. 4 and 5.

FIGS. 4 and 5 are substantial schematic views showing a different embodiment of the CMOS image sensor unit with serial data transmitting function according to the present invention. FIG. 6 is a timing chart showing image data clock (A), transfer enable signal (B) and image data (C) prescribing the operation of the circuits shown in FIGS. 4 and 5.

This embodiment of the CMOS image sensor unit with serial data transmitting function comprises, in addition to the construction of the embodiment shown in FIGS. 1 and 2, a line memory 112 provided on the CMOS image sensor unit side (i.e., transmitting side).

The vertical and horizontal drive circuits 103 and 104 cause the image data to be fed out from the CMOS sensor unit 101 and stored in a line memory 112 in response to serial enable signal, which is obtained by conversion of the input to the input terminals 110A and 110B in the drive circuit 111.

From the line memory 112 the image data is read out and fed out to the parallel-to-serial converter 106 according to the vertical and horizontal drive signals from the vertical and horizontal drive circuits 103 and 104.

The drive circuit (or code circuit) 107 converts the serial image data obtained by conversion in the parallel-to-serial converter 106 to a signal complying with the LVDS signal transmitting system, and transfers this LVDS signal as high-rate LVDS data via the output terminals 108A and 108B.

FIG. 5 shows the construction of the personal computer side (i.e., CPU side) of this embodiment. This embodiment comprises, in addition to the embodiment shown in FIG. 2, an image memory 205 for storing the parallel image data from the parallel-to-serial converter 204, a DMAC circuit 208 and a CPU 209. From the serial-to-parallel converter 204 the image data clock is sent out to a horizontal address counter 210 and the horizontal and vertical synchronizing signals to a vertical & frame address counter 211.

The CPU 209 receives the image data from the serial-to-parallel converter 204, and controls the DMAC circuit 208. The DMAC circuit 208 receives the oscillation frequency signal from the PLL circuit 203, and executes a DMAC control operation while feeding out a reference signal to the serial-to-parallel converter 204, the image memory 205, the horizontal address counter 210 and the driver 207. The driver 207 converts the reference signal to a transfer enable signal and feeds out this signal via output terminals 206A and 206B.

As described above, an interface between the transmitting side (i.e., CMOS sensor side) and receiving side (i.e., personal computer or CPU side) is constituted.

This embodiment corresponds to asynchronous access from the CPU or to DMA. Thus, the embodiment permits directly inputting the image data from the sensor controlled by the CPU to the memory sensor, and also dispenses with timing control circuit with FIFO or the like.

As described above, operation under control of a timing signal as shown in FIG. 6 is executed, and pixel data is updated at each enable timing. In this embodiment, the same signal is provided in the disable period of the enable signal. However, it is possible to make this period to be like the "enable" of the LVDS driver.

In the above description of the embodiment, the CMOS image sensor unit side is made to be the data transmitting side, and the personal computer is made to be the data receiving side. As for the combination of the data transmitting and receiving sides, there are (1) one versus one connection, (2) plurality versus one connection, (3) one versus plurality connection, (4) multiplex connection and (5) plurality versus plurality connection. These connection cases have a purpose of, for instance, using a CMOS image sensor unit as a monitor image pick-up unit by installing the unit at one or a plurality of monitored places and receiving the image data obtained in the unit for displaying the same on a display or the like. The various connection cases will now be described one after another.

(1) One-versus-one connection case

This connection case is a basic construction with one unit provided on the data transmitting side and also one unit on the data receiving side. The construction is shown in FIGS.

1 and 2. As described before, the CMOS image sensor unit 1 comprises the PLL circuit 105, the parallel-to-serial converter 106 and the LVDS driver 107. The parallel-to-serial converter 105 converts the vertical and horizontal synchronizing signals in addition to the 8-bit data. For compressing the data in one clock cycle period, start and stop signals at the clock cycle period are also simultaneously converted. The construction shown in FIGS. 4 and 5 is also of the one versus one connection case.

(2) Plurality versus one connection case

Figure 7:
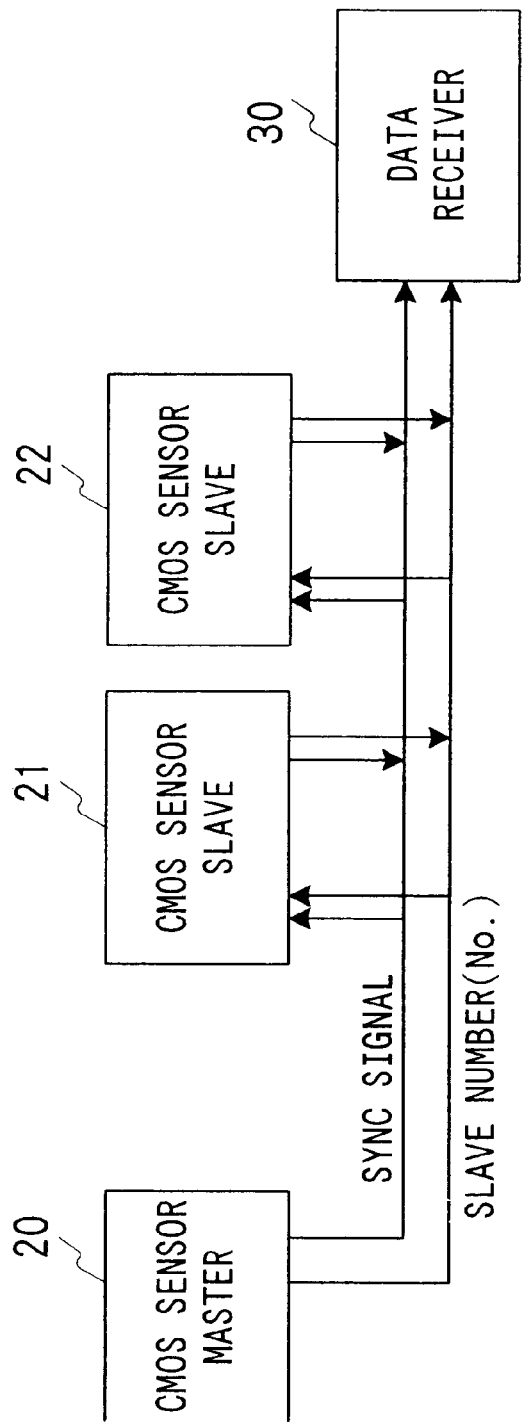
FIG. 7 is drawing representing the plurality-versus-one connection case in the embodiment.

FIG. 7 shows the plurality-versus-one connection case. In this case, a plurality of CMOS image sensor units are provided on the transmitting side, and only one data receiving unit is provided on the receiving side. Specifically, one of a plurality (i.e., three in the Figure) of CMOS image sensor units serves as CMOS image sensor master 20, while the others serve as CMOS sensor slaves 21 and 22. In this case, the CMOS sensor master 20 sends out the slave number data designating a CMOS sensor slave to be controlled together with the synchronizing signals to the CMOS sensor slaves 21 and 22 for controlling the timings and sequence of transfer of image data obtained in the CMOS sensors 20 to 22 to the data receiving unit 30.

In other words, the CMOS sensor master 20 controls the sending-out of own image data to the data receiving unit 30 at such an instant that the send-out instants of the other CMOS sensors 21 and 22 will not coincide. Also, the master 20 executes such control that it sends out the slave number data designating CMOS sensor slaves together with the synchronizing signals to the CMOS sensor slaves 21 and 22 and the CMOS sensor slaves designated by the slave numbers send out the image data to the data receiving unit 30 at instants not coincident with one another according to the received synchronizing signals.

Figure 8:
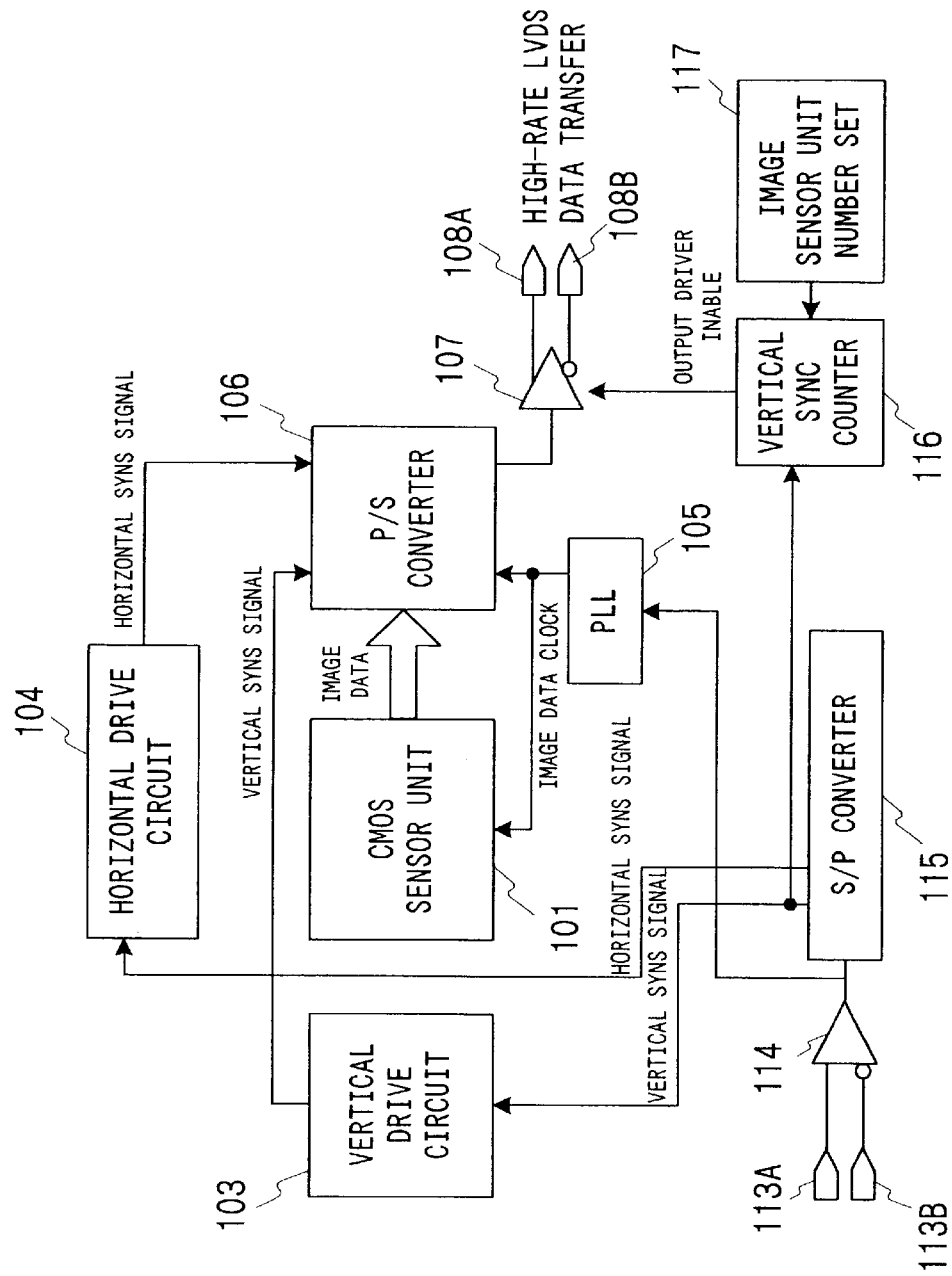
FIG. 8 shows a construction of the CMOS image sensor unit side in the embodiment.

FIG. 8 shows the construction of the CMOS image sensor unit side in this case. In the CMOS sensor master 20, the data indicative of the fact that this unit is the master and that the number of slaves (i.e., two in this example) are set. A unique slave number is assigned and set for each of the CMOS sensor slaves 21 and 22.

The CMOS sensor master 20 once provides one frame of the image data obtained by itself, and no longer provides any image data while the CMOS sensor slaves 21 and 22 send out image data.

The CMOS sensor slaves 21 and 22 operate their own internal sensors (i.e., image pick-up elements) by detecting the vertical and horizontal synchronizing signals and the clock according to the signal received from the CMOS sensor master 20. By counting successive vertical synchronizing signal pulses, the slaves 21 and 22 can check whether a vertical synchronizing signal pulse is identical with their own slave number, for instance the first pulse representing the master, the second representing the slave 21, the third pulse representing the slave 22 and so forth.

When the count of the vertical synchronizing signal pulses become identical with the own sensor number, each CMOS sensor slave enables the LVDS driver to provide sensor data.

Referring to FIG. 8, in each CMOS sensor slave a driver 114 converts a transfer enable signal, which is received from the CMOS sensor master or like unit having a right of main control via input terminals 113A and 113B, to a serial enable signal, and sends out this signal to the CMOS sensor unit 101 and the serial-to-parallel converter 115.

The serial-to-parallel converter 115 converts the received serial enable signal to a parallel signal, and sends out the vertical and horizontal synchronizing signals to the vertical drive circuit 103 and a vertical sync counter 116 and the horizontal drive circuit 104, respectively. The vertical sync counter 116 counts inputted pulses of vertical synchronizing signal, and compares the count of pulses and the own slave number, which is preset in a chip number setting unit 117. When the two compared numbers become identical, an output driver enable signal is sent out to the output driver 107. The output driver 107 transfers the high-rate LVDS data as noted before.

In this embodiment, one of the plurality of CMOS image sensor units is made to be the master having a right of main control while the others are made to be the slaves. However, it is obvious that it is also possible to provide the right of main control in the data receiving unit.

(3) One-versus-plurality connection

In this case, one common CMOS image sensor unit is provided for a plurality of data receiving units as image pick-up units. The construction on the CMOS sensor unit side is the same as shown in FIG. 1. A basic clock circuit is provided on the CMOS image sensor unit side, and image data which is obtained from the CMOS sensor unit in synchronism to the basic clock is sent out successively to the plurality of image pick-up units on the receiving side.

(4) Multiplex connection

This case is a modification of the plurality-versus-one connection described before. in connection with FIG. 7. In this case, a master having a right of main control is constituted as a data receiving unit, and all CMOS sensors are connected thereto as slaves. The master data receiving units generates synchronizing signals. In this construction, all the CMOS image sensor units as slaves are synchronously operated. The data receiving unit on the receiving side thus can freely select the image or switchingly display a plurality of sensor images in one image frame by selecting CMOS sensor unit or units.

As this system, there are two varieties. In one variety system, data bus is switched for each sensor. In the other variety system, common data bus is provided, and sensor drivers are activated by an enable signal. Furthermore, the system is one of two different types, one requiring enable signals corresponding in number to the number of sensors, the other adopting a cascade connection for using only a single enable signal.

(5) Plurality-versus-plurality connection

In this case, a plurality of CMOS image sensor units on the transmitting side and a plurality of signal input systems on the receiving sides are inter-connected by a common cable (or data bus line). This construction permits transmitting the data in units of frames, lines and pixels by preparing a "Busy" signal line which can indicate that the data bus line is not occupied. When the "Busy" signal is "disable", a CMOS sensor unit on the transmitting side knows that the bus is not occupied, so that it can transmit its own sensor No. and data. The receiving side receives data send out from a unit of a necessary sensor No.

Figure 9:
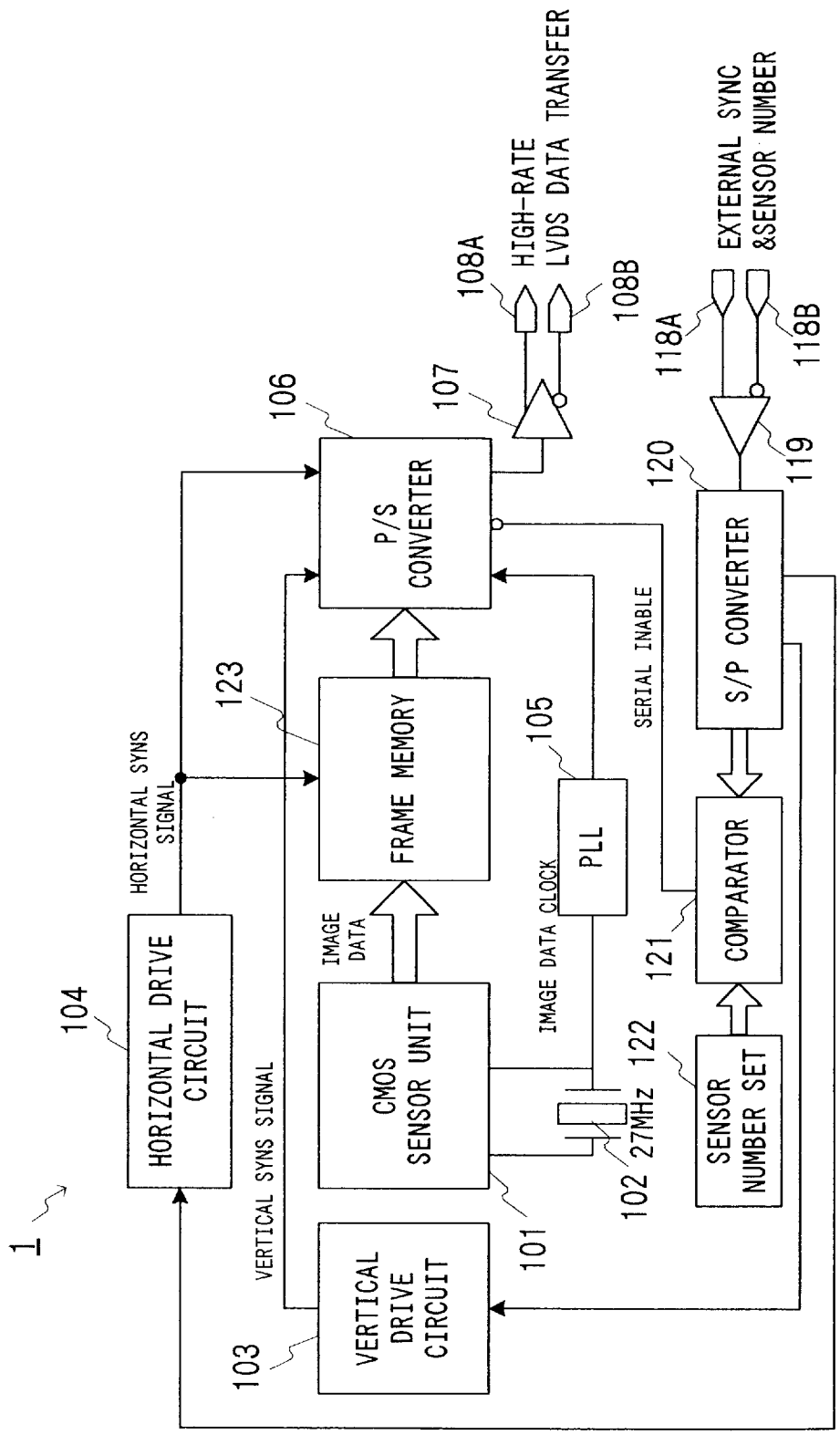
FIG. 9 is a schematic block diagram showing CMOS image sensor unit in the above plurality-to-plurality connection case in the embodiment.

FIG. 9 is a schematic block diagram showing CMOS image sensor unit in the above plurality-to-plurality connection case. In the Figure, reference numerals like those in FIGS. 1 and 4 designate like components.

In the case of FIG. 9, a frame memory 123 is used in lieu of the line memory shown in FIG. 4, and stores image data from the CMOS sensor unit 101.

A driver 119 converts external synchronizing signals and sensor No. data received via input terminals 118A and 118B, and a serial-to-parallel converter 120 converts the serial output of the driver 119 to parallel signal. Synchronizing signals thus obtained are fed out to the vertical and horizontal drive circuits 103 and 104. The sensor No. data is fed out to a comparator 121.

A sensor No. setting unit 122, in which the sensor No. of the CMOS sensor unit 101 to be taken out is preset, feeds out this sensor No. to the comparator 121. The comparator 121 compares the sensor No. from the serial-to-parallel converter 120 and the sensor No. preset in the sensor No. setting unit 122, and when the two No. data are identical, it feeds out a serial enable signal to the parallel-to-serial converter 106. The parallel-to-serial converter 106, receiving the vertical and horizontal synchronizing signals from the vertical and horizontal drive circuits 103 and 104, feeds out the output signal to the LVDS driver 107 in response to the serial enable signal. The driver 107 transfers the LVDS data noted above (shown in FIG. 10(C)) by high-rate LVDS data transfer.

Figure 10:
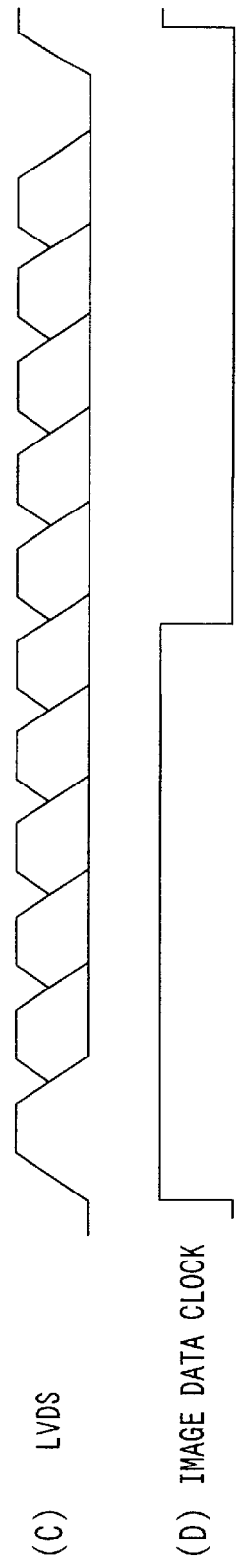
FIGS. 10(A)–(D) show the format of LVDS data in the embodiment.

FIG. 10(A) shows the format of data outputted from the output terminals 108A and 108B. As shown, the LVDS data, which is transferred in response to the serial enable signal and image data clock as shown in FIG. 10(D), includes start data, vertical and horizontal synchronizing signals, image data 7, image data 6, image data 5, image data 4, image data 3, image data 2, image data 1, image data 0 and stop data appearing in the mentioned order.

FIG. 10(B) shows the format of data inputted to the output terminals 117A and 117B. The data includes start data, external vertical and horizontal signals, sensor No. 7, sensor No. 6, sensor No. 5, sensor No. 4, sensor No. 3, sensor No. 2, sensor No. 1, sensor No. 0 and stop data appearing in the mentioned order.

Figure 11:
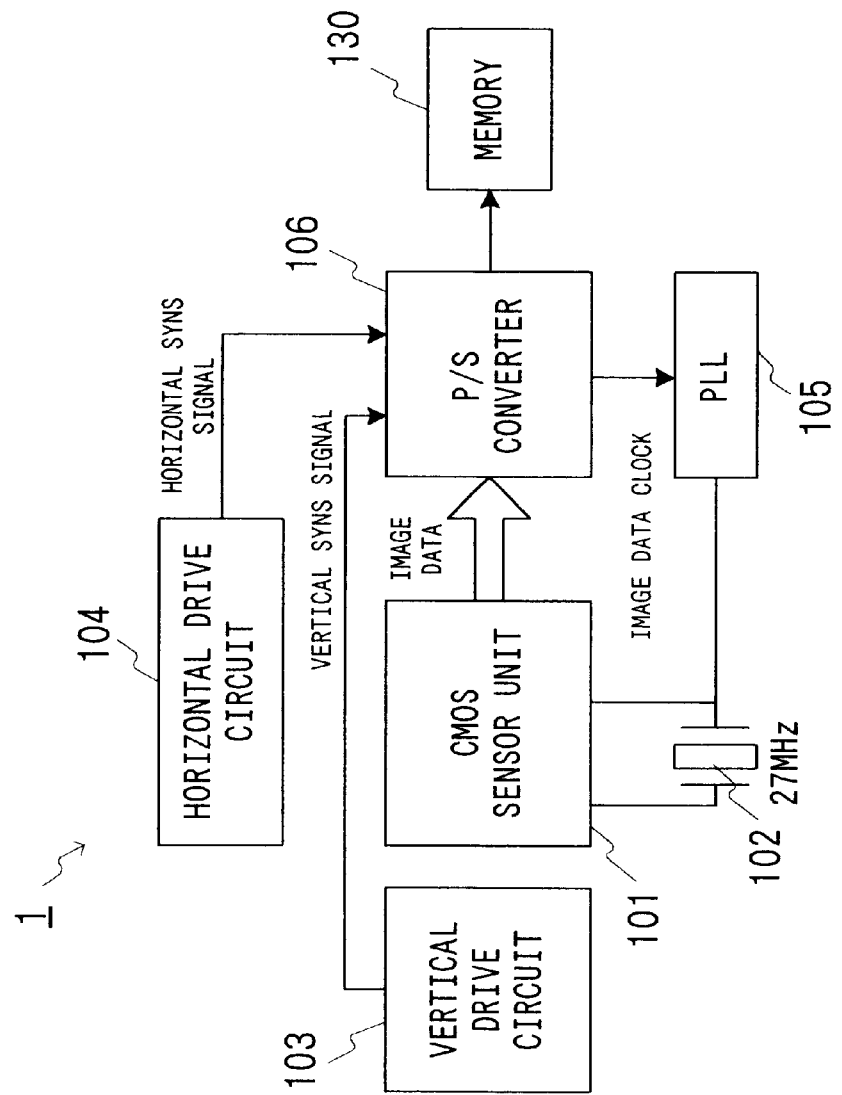
FIG. 11 shows a further embodiment of the CMOS image sensor unit according to the present invention.

FIG. 11 shows a further embodiment of the CMOS image sensor unit according to the present invention. In this case, the system for transmitting the data to the memory outside is dispensed with, and a memory 130, for instance flash memory, is mounted to provide an image pick-up unit with improved portability. In this example, the image data provided from the parallel-to-serial converter 106 is directly stored in the memory 130. The memory may be mounted fixedly or detachably.

The above construction is convenient in view of the portability. In addition, by storing image picked up in the image pick-up unit in the memory, it is possible to read out the image data from the memory or take out the memory for image processing as desired. In this case, the picked-up image may be combined with predetermined image data (for instance background image data) stored in the memory, thus simply obtaining a synthesized image.

In this embodiment, it is of course possible to provide an LVDS driver like the LVDS driver 107 described before.

Figure 12:
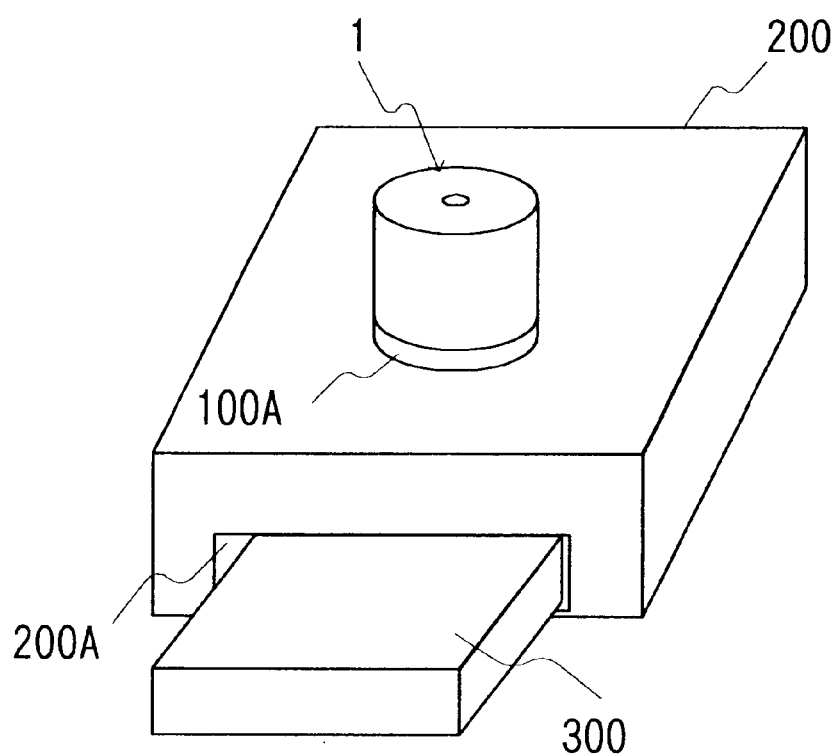
FIG. 12 shows a simplified example of image pick-up unit construction in the embodiment.

FIG. 12 shows an example of such image pick-up unit construction. This example comprises a card-like body 200, which supports the above CMOS image sensor unit 1 mounted on one surface thereof, and has a card insertion hole 200A formed in a side surface. A card-like memory 300, for instance a flash memory, can be inserted and taken out from the body through the card insertion hole 200A. At the bottom of the CMOS image sensor unit 1, a substrate 100A is provided, on which is mounted the electric circuit system having the CMOS sensor unit 101, the oscillator 102, the vertical and horizontal drive circuits 103 and 104, the PLL circuit 105, the parallel-to-serial converter 106, etc.

In each of the above embodiments of the present invention, preset data such as the No. data, e.g., sensor No., chip No., slave No., etc. specifying the sensor unit, the master/slave data specifying the master/slave relation and the ratio factor data, are preset in memory, e.g., image memory, frame memory, card-like memory, etc., setting unit, e.g., chip No. setting unit, sensor No. setting unit, et., CMOS sensor unit, PLL unit and so forth, or they are stored from the master side at the start of operation and read out alone or together with the image data in response to a transmission request from the master side.

The applications of the present invention as described above are by no means limitative, and the present invention can find various other applications as well. In monitoring systems and the like, it is strongly demanded to have the image pick-up units buried in personal computers or dispose a number of image pick-up units in a number of places, and the present invention can usefully meet such demands.

While some preferred embodiments of the CMOS image sensor unit with serial data transmitting function according to the present invention have been described, these particular embodiments are by no means limitative, and the person skilled in the art will readily understand that various changes and modifications of these embodiments are possible to meet particular applications. The present invention thus covers such changes and modifications as well.

For example, while in the above description the CMOS sensor unit includes an oscillator for generating a clock signal, in the basic concept underlying the present invention it is necessary to obtain a clock signal in any way. By providing a means for introducing an externally fed-out clock signal (for instance a clock signal generated from an external oscillator), the oscillator itself need not be included, and the construction thus can be simplified. Also, as for the PLL circuit, the circuit construction itself is not important, and any means which can provide the PLL function can be sufficiently used. For instance, it is possible to use a programmable PLL circuit or the like capable of selecting the ratio factor of the output frequency with respect to the input frequency. Furthermore, optical system (for instance an image pick-up lens) may be provided in the CMOS image sensor unit for focusing an optical image thereon. In this case, a very small image pick-up device can be realized, which has an optical system and an electric system integral with each other.

As has been described in the foregoing, in the CMOS image sensor unit with serial data transmitting function according to the present invention a PLL circuit, a parallel-to-serial converter and an LVDS driver are provided as integral components. Thus, it is possible to obtain a simplified construction, reduce signal deterioration, reduce consumed current, reduce noise, extent the transmission distance and have integral means providing the memory function. It is thus possible to expand the scope of applications of the CMOS image sensor unit with serial data transmitting function.

What is claimed is:

1. A CMOS image sensor unit with serial data transmitting function comprising:

a CMOS sensor unit as a two-dimensional sensor constituted by a plurality of CMOS elements arranged in a regular array in the row and column directions;

a clock unit for obtaining a clock signal at a predetermined oscillation frequency;

a phase locked loop circuit unit receiving the clock signal from the clock unit; and a parallel-to-serial converter unit for converting parallel data read out from the CMOS sensor to serial data in synchronism to the clock signal from the phase locked loop circuit;

these units being mounted on a single image sensor unit.

2. The CMOS image sensor unit with serial data transmitting function of claim 1 further comprising:
   a drive circuit unit for converting the serial image data obtained by conversion in the parallel-to-serial converter unit to a signal complying with an LVDS (low voltage differential signalling) signal transmitting system and providing the signal thus obtained as LVSD data;
   these units being mounted on a single image sensor unit.

3. The CMOS image sensor unit with serial data transmitting function of claim 1 further comprising:
   a memory for storing image data provided from the CMOS sensor unit;
   these units being mounted on a single image sensor unit.

4. The CMOS image sensor unit with serial data transmitting function of claim 1 further comprising:
   a memory for storing image data provided from the CMOS sensor unit;
   a drive circuit unit for converting the serial image data obtained by conversion in the parallel-to-serial converter unit to a signal complying with an LVDS (low voltage differential signalling signal transmitting system and providing the signal thus obtained as LVDS data;
   these units being mounted on a single image sensor unit.

5. The CMOS image sensor unit with serial data transmitting function according to claim 3, wherein the memory is a line memory or a frame memory.

6. The CMOS image sensor unit with serial data transmitting function of claim 1 further comprising:
   a memory for storing the serial data from the parallel-to-serial converter unit;
   these units being mounted on a single image sensor unit.

7. The CMOS image sensor unit with serial data transmitting function according to claim 1, wherein the clock unit includes an oscillator for generating the clock signal by oscillation.

8. The CMOS image sensor unit with serial data transmitting function according to claim 1, wherein the clock unit includes a means for introducing a clock signal generated from an external oscillator.

9. The CMOS image sensor unit with serial data transmitting function according to claim 1, wherein the PLL circuit unit includes a program type PLL circuit.

10. The CMOS image sensor unit with serial data transmitting function according to claim 1, which further comprises a pick-up lens.

11. The CMOS image sensor unit with serial data transmitting function according to claim 6, wherein a drive circuit unit for converting the serial image data read out from the memory to a signal complying with an LVDS (Low Voltage Differential Signalling) signal transmitting system and providing the signal thus obtained as LVDS data is also mounted on the single image sensor unit.

12. The CMOS image sensor unit with serial data transmitting function according to claim 1, wherein the image data is sent out from the parallel-to-serial converter unit, the drive circuit unit or the memory according to an external transfer enable signal.

13. The CMOS image sensor unit with serial data transmitting function according to claim 6, wherein predetermined image data is stored in the memory and read out with image data obtained by pick-up.

14. The CMOS image sensor unit with serial data transmitting function according to claim 6, wherein predetermined image data is stored in the memory and read out in such a form that it is combined with image data obtained by pick-up.

15. The CMOS image sensor unit with serial data transmitting function according to claim 6, wherein preset data is stored in the memory and read out together with the image data obtained by pick-up.

16. The CMOS image sensor unit with serial data transmitting function according to claim 6, wherein preset data is stored in the memory and read out together with the image data obtained by pick-up and the preset data includes at least either sensor number data specifying a sensor unit or master/slave data specifying the master/slave relation of a sensor unit.

17. An image pick-up unit comprising a card-like body, a CMOS image sensor unit with serial data transmitting function comprising a CMOS sensor unit as a two-dimensional sensor constituted by a plurality of CMOS elements arranged in a regular array in the row and column directions, a clock unit for obtaining a clock signal at a predetermined oscillation frequency, a phase locked loop circuit unit receiving the clock signal from the clock unit and a parallel-to-serial converter unit for converting parallel data read out from the CMOS sensor to serial data in synchronism to the clock signal from the phase locked loop circuit, these units being mounted on a single image sensor unit being mounted on one surface of the card-like body, the card-like body having a card insertion hole formed in one surface of it, the card insertion hole permitting a card-like memory, which can store image data provided from the CMOS image sensor unit, to be inserted and taken out through it into and out of the body.

18. The image pick-up unit of claim 17 further comprising a drive circuit unit for converting the serial image data obtained by conversion in the parallel-to-serial converter unit to a signal complying with an LVDS (low voltage differential signalling) signal transmitting system and providing the signal thus obtained as LVDS data, these units being mounted on a single image sensor unit being mounted on one surface of the card-like body, the card-like body having a card insertion hole formed in one surface of it, the card insertion hole permitting a card-like memory, which can store image data provided from the CMOS image sensor unit, to be inserted and taken out through it into and out of the body.

19. The image pick-up unit of claim 17 further comprising a memory for storing image data provided from the CMOS sensor unit, these units being mounted on a single image sensor unit being mounted on one surface of the card-like body, the card-like body having a card insertion hole formed in one surface of it, the card insertion hole permitting a card-like memory, which can store image data provided from the CMOS image sensor unit, to be inserted and taken out through it into and out of the body.

20. The image pick-up unit of claim 17 further comprising a memory for storing image data provided from the CMOS sensor unit, and a drive circuit unit for converting the serial image data obtained by conversion in the parallel-to-serial converter unit to a signal complying with an LVDS (low voltage differential signalling) signal transmitting system and providing the signal thus obtained as LVDS data, these units being mounted on a single image sensor unit being mounted on one surface of the card-like body, the card-like body having a card insertion hole formed in one surface of it, the card insertion hole permitting a card-like memory, which can store image data provided from the CMOS image sensor unit, to be inserted and taken out through it into and out of the body.

21. The image pick-up unit of claim 17 further comprising a memory for storing the serial data from the parallel-toserial converter unit, these units being mounted on a single image sensor unit being mounted on one surface of the card-like body, the card-like body having a card insertion hole formed in one surface of it, the card insertion hole permitting a card-like memory, which can store image data provided from the CMOS image sensor unit, to be inserted and taken out through it into and out of the body.

22. An image data transmitting and receiving system, in which the CMOS image sensor unit according to claim 1 is provided on transmitting side, and which comprises only a single data receiving unit for receiving data sent out from the transmitting side.

23. An image data transmitting and receiving system, in which a plurality of CMOS image sensor units according to claim 1 are provided on transmitting side units, and which comprises only a single data receiving unit provided on receiving side for receiving data sent out from the transmitting side.

24. An image data transmitting and receiving system, in which only a single CMOS image sensor unit according to claim 1 is provided on transmitting side, and which comprises a plurality of data receiving units provided on receiving side for receiving data sent out from the transmitting side, the transmitting side CMOS image sensor unit being accessed independently by the receiving side data receiving units for receiving image data.

25. An image data transmitting and receiving system, which comprises a plurality of CMOS image sensor units according to claim 1, one of the CMOS sensor units being used as master data receiving unit having a right of main control, the other CMOS image sensor units being all used as slave units, the master data receiving unit generating a synchronizing signal and accessing the slave units in synchronism with the synchronizing signal for receiving image data.

26. An image data transmitting and receiving system, wherein a plurality of CMOS image sensor units according to claim 1 are provided on transmitting and receiving sides, the transmitting and receiving sides being connected by common bus lines, vacant ones thereof being used for transmitting and receiving data.

27. A method for generating image data comprising:

a) reading out an image signal from each of a plurality of CMOS elements;

b) converting the image signals to digital image data;

c) providing the digital image data to a parallel to serial converter to generate serial digital image data; and d) providing the serial digital image data to an low voltage differential signaling driver to generate a high-rate low voltage differential signaling encoded image signal.

28. The method of claim 27 further comprising:

amplifying the image signals before the act of converting the image signals to digital image data.

29. The method of claim 27 wherein the act of reading out an image signal from each of a plurality of CMOS elements is performed in synchronism with a clock signal.

30. The method of claim 27 further comprising:

generating a vertical synchronizing signal;

generating a horizontal synchronizing signal; and generating an image clock signal, wherein the serial digital image data is generated based on at least two of the vertical synchronizing signal, the horizontal synchronizing signal and the image clock signal.

31. The method of claim 30 further comprising:

accepting a transfer enable signal, wherein the vertical and horizontal synchronizing signals are generated based on the transfer enable signal.

32. The method of claim 30 further comprising:

accepting a transfer enable signal; and generating a serial enable signal based on the transfer enable signal, wherein the vertical and horizontal synchronizing signals are generated based on the serial enable signal.

33. The method of claim 27, further comprising:

supplying a clock signal to a phase locked loop circuit from a clock unit; and supplying a clock signal from the phase locked loop circuit for converting the digital image data to the serial digital image data in synchronism to the clock signal from the phase locked loop circuit.

* * * * *